United States Patent
Basso et al.

(10) Patent No.: US 6,602,299 B1
(45) Date of Patent: *Aug. 5, 2003

(54) FLEXIBLE SYNCHRONIZATION FRAMEWORK FOR MULTIMEDIA STREAMS

(75) Inventors: Andrea Basso, N. Long Branch, NJ (US); Joern Ostermann, Red Bank, NJ (US)

(73) Assignee: AT&T Corp., New York, NY (US)

( * ) Notice: Subject to any disclaimer, the term of this patent is extended or adjusted under 35 U.S.C. 154(b) by 157 days.

This patent is subject to a terminal disclaimer.

(21) Appl. No.: 09/709,652

(22) Filed: Nov. 13, 2000

Related U.S. Application Data

(63) Continuation of application No. 08/916,211, filed on Aug. 22, 1997, now Pat. No. 6,177,928.

(51) Int. Cl.[7] .......................... G06F 15/00; G06F 17/00; G06F 11/00
(52) U.S. Cl. ...................... 715/501.1; 715/526; 704/200
(58) Field of Search .............................. 707/500–500.1, 707/526; 345/418, 618–619, 636, 650, 676, 473–475, 706; 704/200–210, 235, 260, 275; 715/500.1

(56) References Cited

U.S. PATENT DOCUMENTS

| | | | |
|---|---|---|---|
| 4,884,972 A | * | 12/1989 | Gasper ........................ 434/185 |
| 4,913,539 A | | 4/1990 | Lewis |
| 5,689,618 A | | 11/1997 | Gasper et al. |
| 5,878,396 A | | 3/1999 | Henton |
| 5,918,002 A | | 6/1999 | Klemets et al. |

\* cited by examiner

*Primary Examiner*—Alford Kindred

(57) ABSTRACT

A flexible framework for synchronization of multimedia streams synchronizes the incoming streams on the basis of the collaboration of a transmitter-driven and a local inter-media synchronization module. Whenever the first one it is not enough to ensure reliable synchronization or cannot assure synchronization because the encoder does not know the exact timing of the decoder, the second one comes into play. Normally, the transmitter-driven module uses the stream time stamps if their drift is acceptable. If the drift is too high, the system activates an internal inter-media synchronization mode while the transmitter driven module extracts the coarsest inter-media synchronization and/or the structural information present in the streams. The internal clock of the receiver is used as absolute time reference. Whenever the drift value stabilizes to acceptable values, the system switches back smoothly to the external synchronization mode. The switch has a given hysteresis in order to avoid oscillations between internal and external synchronization modes.

18 Claims, 2 Drawing Sheets

FLEXIBLE SYNCHRONIZATION FRAMEWORK FOR MULTIMEDIA STREAMS

This is a continuation of U.S. patent application Ser. No. 08/916,211, filed Aug. 22, 1997 now U.S. Pat. No 6,177,928.

BACKGROUND OF THE INVENTION

The present invention relates generally to methods and systems for synchronizing data, and more particularly to a method and system for synchronizing multimedia streams.

A common approach in multimedia inter-media and intra-media synchronization consists of introducing time-stamps in the media stream, which time stamps carry information relative to an absolute clock reference and relative to events to be synchronized. The Program Clock Reference (PCR) and Decoding Time Stamps (DTS) and Presentation Time Stamps (PTS) of MPEG-2 are an example of such an approach. The receiver decodes the time-stamps and synchronizes the streams accordingly.

In case of small amounts of jitter due to transmission of processing delays, mechanisms of clock recovery and jitter compensation, such as Phase Locked Loops (PLLs), are employed at the receiver end. Normally, these mechanisms work satisfactorily in the case of small amounts of jitter.

The disadvantages of such approaches, however, are the lack of flexibility and adaptability. If the jitter of one of the time stamps is too high the receiver does not have the means to compensate it. In this case, synchronization is lost forever for the event to be synchronized by this time stamp. Furthermore, if the encoder does not know the exact timing of the decoder, the encoder cannot specify all the time-stamps and the method is not applicable.

The present invention is therefore directed to the problem of developing a method and system for synchronizing multimedia streams that is highly reliable despite the presence of large amounts of jitter, and that operates independently and without a priori knowledge of the timing of the decoder when encoding the data.

SUMMARY OF THE INVENTION

The present invention solves this problem by switching between a slave, transmitter-driven synchronization mode and a local (i.e., receiver-driven) synchronization mode whenever the temporal references arriving from the transmitter become unreliable. In the alternative, the present invention employs both slave and local synchronization modes to solve this problem. The present invention is particularly effective in the synchronization of variable rate data streams such as text and facial animation parameters, but is also applicable to other data streams, such as video and audio streams.

According to the present invention, a method for synchronizing multimedia streams comprises the steps of using a transmitter-driven synchronization technique which relies upon a plurality of temporal references (or time stamps) inserted in the multimedia streams at an encoding end, using an internal inter-media synchronization technique at a decoding end if a performance measurement value of at least one of the plurality of temporal references exceeds some predetermined threshold, and extracting a coarsest inter-media synchronization and/or structural information present in the multimedia stream using the transmitter-driven technique and inputting the coarsest inter-media synchronization and/or structural information to a controller employing the internal inter-media synchronization technique.

According to the present invention, it is particularly advantageous if the above method switches back to the transmitter-driven synchronization technique whenever the performance measurement value stabilizes to an acceptable value.

Another particularly advantageous embodiment of the present invention occurs when the method provides a predetermined hysteresis when switching between one synchronization technique to another to avoid oscillations between the two synchronization techniques.

According to the present invention, a system for synchronizing a multimedia stream includes a transmitter-driven synchronization controller, an internal inter-media synchronization controller and a processor. The transmitter-driven synchronization controller includes a control input, synchronizes the multimedia stream based on a plurality of time stamps in the multimedia stream inserted at an encoding end and extracts a coarsest inter-media synchronization and/or structural information present in the multimedia stream. The internal inter-media synchronization controller also includes a control input, is coupled to the transmitter-driven synchronization controller and receives the coarsest inter-media synchronization and/or structural information present in the multimedia stream. The processor receives the plurality of time stamps, is coupled to the control input of the transmitter-driven synchronization controller and the control input of the internal inter-media synchronization controller and activates the internal inter-media synchronization controller if a performance measurement value exceeds some predetermined threshold.

One particularly advantageous aspect of the present invention is that the processor activates the transmitter-driven synchronization controller whenever the performance measurement value stabilizes to an acceptable level.

It is also particularly advantageous when the processor includes predetermined hysteresis to avoid oscillations in switching between the internal inter-media synchronization controller and the transmitter-driven synchronization controller.

Further, according to the present invention, an apparatus for synchronizing a facial animation parameter stream and a text stream in an encoded animation includes a demultiplexer, a transmitter-based synchronization controller, a local synchronization controller, a text-to-speech converter, a phoneme-to-video converter and a switch. The demultiplexer receives the encoded animation, and outputs a text stream and a facial animation parameter stream, wherein the text stream includes a plurality of codes indicating a synchronization relationship with a plurality of mimics in the facial animation parameter stream and the text in the text stream. The transmitter-based synchronization controller is coupled to the demultiplexer, includes a control input, controls the synchronization of the facial animation parameter stream and the text stream based on the plurality of codes placed in the text stream during an encoding process, and outputs the plurality of codes. The local synchronization controller is coupled to the transmitter-based synchronization controller, and includes a control input. The text-to-speech converter is coupled to the demultiplexer, converts the text stream to speech, outputs a plurality of phonemes, and outputs a plurality of real-time time stamps and the plurality of codes in a one-to-one correspondence, whereby the plurality of real-time time stamps and the plurality of codes indicate a synchronization relationship between the plurality of mimics and the plurality of phonemes. The phoneme-to-video converter is coupled to the text-to-speech converter, and synchronizes a plurality of facial mimics with the plurality of phonemes based on the plurality of real-time time stamps and the plurality of codes. The switch is coupled to the transmitter-based synchronization controller and the local synchronization controller, and switches between the transmitter-based synchronization controller and the local synchronization controller based on a predetermined performance measurement of the plurality of codes.

Another aspect of the present invention includes a synchronization controller for synchronizing multimedia streams without a priori knowledge of an exact timing of a decoder in an encoder. According to the present invention, the synchronization controller operates in three possible modes—an encoder based synchronization mode, a switching mode and a cooperating synchronization mode. In this instance, the switching synchronization mode normally uses the encoder based synchronization technique, but switches to a decoder based synchronization technique whenever the encoder based synchronization technique becomes unreliable. The cooperating synchronization mode uses an encoder based synchronization technique to provide a first level of synchronization, and uses a decoder based synchronization technique to provide a second level of synchronization.

Finally, the present invention is applicable to the synchronization of any multimedia streams, such as text-to-speech data, facial animation parameter data, video data, audio data, and rendering.

DETAILED DESCRIPTION

The present invention provides a framework for flexible synchronization of multimedia streams. Its main feature is its capability of switching between a slave, transmitter-driven synchronization mode and a receiver-driven or local synchronization mode whenever the temporal references arriving from the transmitter are unreliable. Alternatively, the present invention provides the capability of using both the slave and local synchronization modes. Consequently, the present invention can operate in three different modes: (1) a transmitter based synchronization mode; (2) a switching mode in which a transmitter based synchronization technique is used unless the transmitter based -synchronization becomes unreliable, in which case the system switches to receiver based synchronization technique; and (3) a cooperating mode in which a transmitter based synchronization technique provides a first (or coarse) level of synchronization and a receiver based synchronization technique provides a second (or finer) level of synchronization. The present invention is particularly effective in synchronizing variable rate streams, such as text and facial animation parameters, as well as video and audio, or rendering data.

The present invention synchronizes the incoming streams on the basis of the collaboration of a transmitter-driven and a local inter-media synchronization module. Whenever the first one is not enough to ensure reliable synchronization or cannot ensure synchronization because the encoder does not know the exact timing of the decoder, the second one comes into play.

In a typical scenario, the transmitter-driven module uses the data stream time stamps if their drift is acceptable. If the drift of the time stamps is too high (e.g., above 80 milliseconds), the system activates an internal inter-media synchronization mode, while the transmitter-driven module extracts the coarsest inter-media synchronization and/or the structural information present in the streams. (While 80 milliseconds is used as an example of a threshold for setting the switching from one synchronization mode to the other, other values will suffice, depending upon the exact application and the underlying data, as well as other variables. Furthermore, 80 milliseconds should be interpreted as merely an approximation, i.e., as some value on that order of magnitude.) The internal clock of the receiver is used as absolute time reference. Whenever the drift value stabilizes within acceptable values (e.g., less than 80 milliseconds), the system switches back smoothly to the external synchronization mode. The switch uses a given hysteresis to avoid oscillations between the internal and external synchronization modes. A simple block diagram is shown in FIG. 1.

Figure 1:
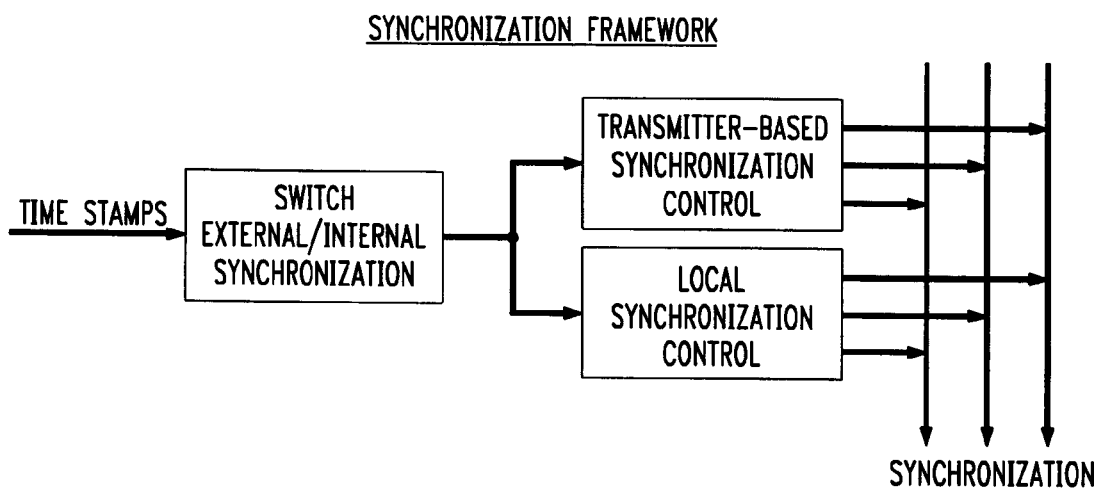
FIG. 1 depicts a block diagram of the system of the present invention.

Referring to FIG. 1, a switch 11 that determines which of the two synchronization modules 13, 15 will be used receives the time stamps from the encoder (not shown). The time stamps are then provided by the switch 11 to both of the synchronization modules 13, 15, if both are being used, or to the one module that is being used for synchronization at the time. In one possible embodiment of the present invention, the switch 11 decides which of the two modules to use depending upon the amount of jitter present in a particular time stamp. In this case, the switch is an intelligent switch, such as a microprocessor or software program. In another possible embodiment of the present invention, the transmitter-based synchronization controller decides which of the two modes to use and activates the switch. In this case, the switch need not be an intelligent switch, as all of the processing is included in the transmitter-based synchronization controller. In either case, if the jitter exceeds 80 milliseconds, for example, then the switch 11 switches to local synchronization control 15. While 80 milliseconds is used, other values for this decision criteria can be employed without departing from the present invention.

Transmitter-Based Synchronization Control

Transmitter-based synchronization consists of introducing temporal references or time-stamps in the media stream, which temporal references carry information relative to an absolute clock reference and relative to events to be synchronized. This is a known technique, and by itself does not form part of the present invention, hence need not be described in further detail herein. The Program Clock Reference (PCR) and Decoding Time Stamps (DTS) and Presentation Time Stamps (PTS) of MPEG-2 are an example of such an approach. The receiver decodes the time-stamps and synchronizes the streams accordingly.

Local Synchronization Control

According to the present invention, local synchronization control 15 utilizes the encoder time stamps included in the text-to-speech text stream, which encoder time stamps are output by the transmitter-based synchronization control 13, as shown in FIG. 1. The local synchronization control 15 reads the encoder time stamp, generates a real-time time stamp for the facial animation stream (or other data stream) and associates the correct facial animation parameter with the real-time time stamp using the encoder time stamp as a reference. This enables the local synchronization control 15 to provide additional synchronization beyond that provided by the transmitter-based synchronization control 13. Another way of looking at the present invention is that the transmitter-based synchronization control 13 provides coarse synchronization, while the receiver-based or local synchronization control 15 provides finer synchronization. If the synchronization is acceptable without applying the local synchronization, then the switch 11 never activates the local synchronization. Alternatively, one could operate both synchronization controllers 13, 15 without determining whether to activate the fine synchronization, which would only result in more processing than otherwise is necessary.

Text and FAP Synchronization in MPEG-4

Figure 2:
FIG. 2 depicts the environment in which the present invention operates.

Currently, the MPEG-4 Systems Verification Model (VM) assumes that synchronization between the text input and the Facial Animation Parameters SAP) input stream, is obtained by means of time stamps (see FIG. 2). However, the encoder does not know the timing of the decoder TTS. Hence, the encoder cannot specify the alignment between synthesized words and the facial animation. Furthermore, timing varies between different TTS systems.

Another aspect of the present invention is as follows. Encoder time stamps (ETS) are included in the text string transmitted to the TTS and in the FAP stream transmitted to the receiver. The transmitter-driven synchronization control reads the ETS and passes it to the local inter media synchronization module, which generates a real-time time stamp (RTS) for the facial animation system and associates the correct FAP with the real-time time stamp using the encoder time stamp of the bookmark as a reference. Similarly a decoder time stamp (DTS) is generated for the decoder system. The transmitter-driven synchronization control checks that the ETS is met with a maximum drift of 80 milliseconds, for example.

Figure 3:
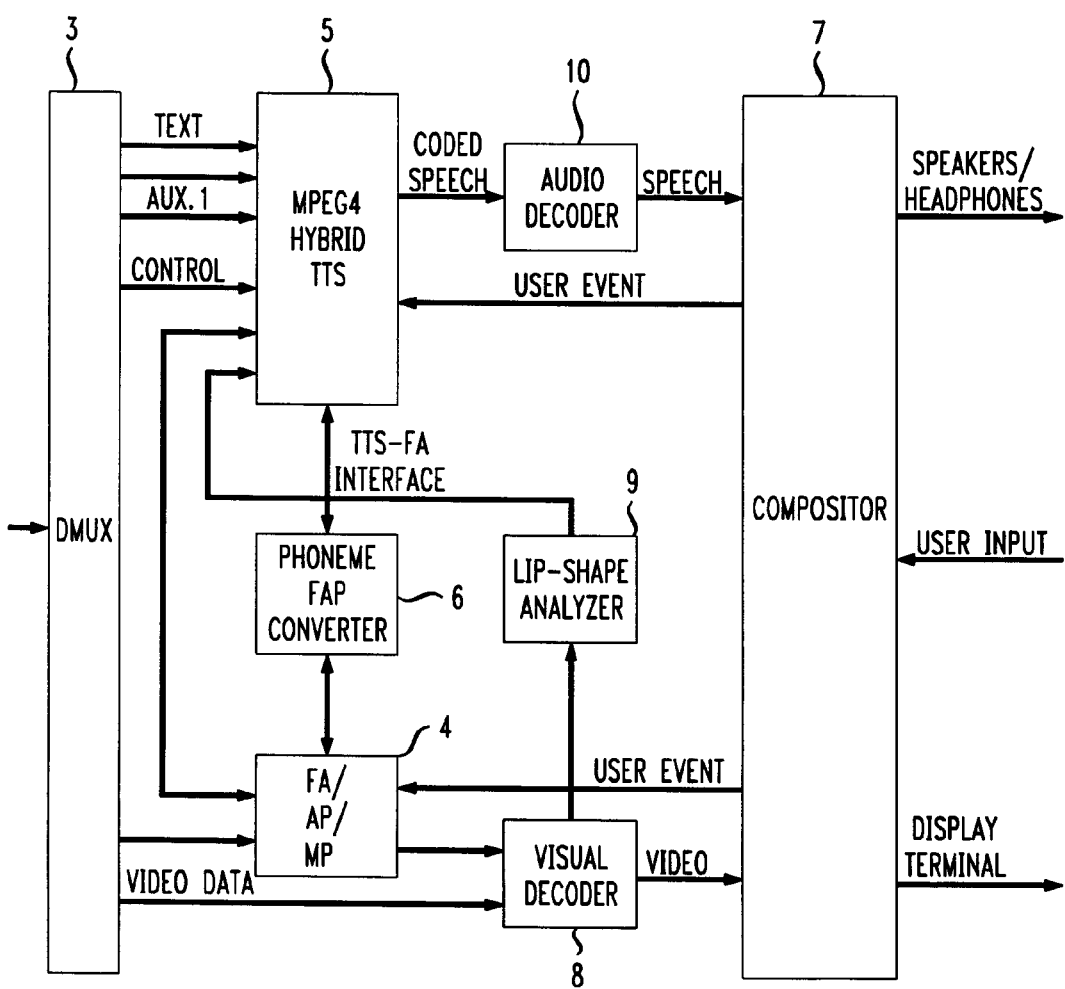
FIG. 3 depicts the architecture of an MPEG-4 decoder using text-to-speech conversion, in which the present invention is used to synchronize a text stream and a facial animation parameter stream.

Referring to FIG. 3, according to the present invention, the synchronization of the decoder system can be achieved by using local synchronization by means of event buffers at the input of the FA/AP/MP 4 and the audio decoder 10.

A maximum drift of 80 msec between the encoder time stamp (ETS) in the text and the ETS in the Facial Animation Parameter (FAP) stream is tolerable.

One embodiment for the syntax of the bookmarks when placed in the text stream consists of an escape signal followed by the bookmark content, e.g., \!M{bookmark content}. The bookmark content carries a 16-bit integer time stamp ETS and additional information. The same ETS is added to the corresponding FAP stream to enable synchronization. The class of Facial Animation Parameters is extended to carry the optional ETS.

If an absolute clock reference (PCR) is provided, a drift compensation scheme can be implemented. Please note, there is no master slave notion between the FAP stream and the text. This is because the decoder might decide to vary the speed of the text as well as a variation of facial animation might become necessary. For example, if an avatar needs to react to visual events occurring in its environment, such as when Avatar A is talking to a user, and Avatar B enters the room. In this case, a natural reaction of Avatar A is to look at Avatar B, smile and while doing so, slow down the speed of the spoken text.

Autonomous Animation Driven Mostly by Text

In the case of facial animation driven by text, the additional animation of the face is mostly restricted to events that do not have to be animated at a rate of 30 frames per second. Especially high-level action units like smile should be defined at a much lower rate. Furthermore, the decoder can do the interpolation between different action units without tight control from the receiver.

The present invention includes action units to be animated and their intensity in the additional information of the bookmarks. The decoder is required to interpolate between the action units and their intensities between consecutive bookmarks. This provides the advantages of authoring animations using simple tools, such as text editors, and significant savings in bandwidth.

FIG. 2 depicts the environment in which the present invention is to be used. The multimedia stream is created and coded in the encoder section 1. The encoded multimedia stream is then sent through a communication channel (or storage) to a remote destination. At the remote destination, the multimedia is recreated by the decoder 2. At this stage, the decoder 2 must synchronize the one set of events (e.g., facial animations) with another set of data (e.g., the speech of the avatar) using only information encoded with the original multimedia streams.

FIG. 3 depicts the MPEG-4 architecture of the decoder, which has been modified to operate according to the present invention. The signal from the encoder 1 (not shown) enters the Demultiplexer (DMUX) 3 via the transmission channel (or storage, which can also be modeled as a channel). The DMUX 3 separates outs the text and the video data, as well as the control and auxiliary information. The FAP stream, which includes the Encoder Time Stamp (ETS), is also output by the DMUX 3 directly to the FA/AP/MP 4, which is coupled to the Text-to-Speech Converter (TTS) 5, a Phoneme FAP converter 6, a compositor 7 and a visual decoder 8. A Lip Shape Analyzer 9 is coupled to the visual decoder 8 and the TTS 5. User input enters via the compositor 7 and is output to the TTS 5 and the FA/AP/MP 4. These events include start, stop, etc.

The TTS 4 reads the bookmarks, and outputs the phonemes along with the ETS as well as with a Real-time Time Stamp (RTS) to the Phoneme FAP Converter 6. The phonemes are used to put the vertices of the wireframe in the correct places. At this point the image is not rendered.

This data is then output to the visual decoder 8, which renders the image, and outputs the image in video form to the compositor 7. It is in this stage that the FAPs are aligned with the phonemes by synchronizing the phonemes with the same ETS/RTS combination with the corresponding FAP with the matching ETS.

The text input to the MPEG-4 hybrid text-to-speech (TTS) converter 5 is output as coded speech to an audio decoder 10. In this system, the audio decoder 10 outputs speech to the compositor 7, which acts as the interface to the video display (not shown) and the speakers (not shown), as well as to the user.

On the video side, video data output by the DMUX 3 is passed to the visual decoder 8, which creates the composite video signal based on the video data and the output from the FA/AP/MP 4.

There are two different embodiments of the present invention. In a first embodiment, the ETS placed in the text stream includes the facial animation. That is, the bookmark (e.g., escape sequence) is followed by a 16 bit codeword that represents the appropriate facial animation to be synchronized with the speech at this point in the animation.

Alternatively, the ETS placed in the text stream acts as a pointer in time to a particular facial animation in the FAP stream. Specifically, the escape sequence is followed by a 16 bit code that uniquely identifies a particular place in the FAP stream.

While this aspect (i.e., the local synchronization) of the present invention has been described in terms of animation data, the animation data could be replaced with natural audio or video data, or rendering data for synthetic imaging. More specifically, the above description provides a method and system for aligning animation data with text-to-speech data. However, the same method and system applies if the text-to-speech data is replaced with audio or video or rendering data. In fact, the alignment of the two data streams is independent of the underlying data, particularly with regard to the TTS stream. Furthermore, the present invention applies to any two data streams in which the encoder does not contain a priori knowledge of the exact timing of the decoder.

What is claimed is:

1. A method for independently synchronizing multimedia streams in a decoder comprising:

receiving a plurality of encoded data streams having an encoded time stamp from a transmitter;

electing a master stream from the plurality of data streams;

reading the encoded time stamp for the master stream; and generating a real-time time stamp using the encoded time stamp as a reference.

2. The method of claim 1, further comprising adjusting the timing of one data stream to compensate for delay.

3. The method of claim 1, wherein one of the plurality of data streams is a Facial Animation Parameter having a plurality of action units.

4. The method of claim 1, wherein one of the plurality of data streams is text-to-speech data.

5. The method of claim 1, wherein one of the plurality of data streams is video having a plurality of action units.

6. The method of claim 4, wherein the encoder time stamp included in the text-to-speech stream is used as a basis for synchronization.

7. The method of claim 3, wherein the decoder independently interpolates between different action units in order to synchronize the various data streams.

8. A system for synchronizing multimedia streams comprising:

a transmitter for encoding and time stamping a multi-media data stream;

an internal inter-media synchronization controller for receiving and decoding the multi-media stream; and a processor coupled to said controller for regenerating a second time stamp independent of the encoder.

9. The system of claim 8, wherein the internal inter-media synchronization controller further comprises an internal clock coupled to the processor.

10. The system of claim 9, wherein the processor regenerates a decoder time stamp for synchronizing the multi-media streams independent of the encoding time stamp.

11. An apparatus for synchronizing a facial animation parameter stream and a text stream in an encoded animation comprising:

a demultiplexer for receiving the encoded animation, outputting a text stream and a Facial Animation Parameter stream, said text stream including a plurality of codes indicating a synchronization relationship with a plurality of mimics in the Facial Animation Parameter stream and the text in the text stream;

a local synchronization controller coupled to the demultiplexer and having
      a control input,
      a text-to-speech converter coupled to the demultiplexer, converting the text stream into speech, outputting a plurality of phonemes and outputting a plurality of real-time time stamps and the plurality of codes in a one-to-one correspondence, where the plurality of real-time time stamped and the plurality of codes indicate a synchronization relationship between the plurality of mimics and the plurality of phonemes; and
      a phoneme to video converter being coupled to the text-to-speech converter, being coupled to the text-to-speech converter, synchronizing a plurality of facial mimics with the plurality of phonemes based on the plurality of real-time time stamps and the Plurality of codes.

12. The apparatus of claim 11, further comprising a compositor converting the speech stream and video stream to a composite video signal.

13. The apparatus of claim 11, wherein the phoneme to video converter includes:

a facial animator creating a wireframe image based on the synchronized plurality of phonemes and the plurality of facial mimics; and a visual decoder being coupled to the demultiplexer and the facial animator, and rendering a video image based on the wireframe image.

14. An apparatus for synchronizing at least one facial animation stream with at least one text data ream comprising:

a demultiplexer for separating data streams to audio, video and facial animation streams;

a text-to-speech converter for receiving a user input and generating a real-time time stamp to a phoneme FAP Converter;

an audio decoder for decoding code speech into an audio data stream;

a visual decoder for decoding video and facial animation data streams; and a compositor for synchronizing speech and video data streams independent of the encoder and with respect to the user input information.

15. The apparatus of claim 14, wherein the compositor synchronizes video and audio data streams with reference to an absolute clock.

16. The apparatus of claim 15, wherein the absolute clock is an encoder time stamp placed in the text data stream.

17. The apparatus of claim 16, wherein the encoder time stamp further includes data relating to one or plurality of facial animation parameters.

18. The apparatus of claim 16, wherein the encoder time stamp identifies a unique location in the facial animation parameter data stream.

* * * * *

UNITED STATES PATENT AND TRADEMARK OFFICE
CERTIFICATE OF CORRECTION

PATENT NO. : 6,602,299 B1 Page 1 of 1
DATED : August 5, 2003
INVENTOR(S) : Andrea Basso and Joern Ostermann It is certified that error appears in the above-identified patent and that said Letters Patent is hereby corrected as shown below:

<u>Title page,</u>
Item [57], ABSTRACT,
Line 4, "Whenever the first one it is" is replace with -- Whenever the first one is --

<u>Column 8,</u>
Line 24, "Plurality" is replaced with -- plurality --
Line 38, "data ream" is replaced with -- data stream --

Signed and Sealed this

Twenty-eighth Day of October, 2003

JAMES E. ROGAN
*Director of the United States Patent and Trademark Office*